(12) United States Patent
Moorcroft et al.

(10) Patent No.: US 11,105,276 B2
(45) Date of Patent: Aug. 31, 2021

(54) PROTECTING AN INTERNAL COMBUSTION ENGINE OF A VEHICLE FROM DAMAGE BY INDUCTION OF LIQUID

(71) Applicant: JAGUAR LAND ROVER LIMITED, Warwickshire (GB)

(72) Inventors: Adam Moorcroft, Coventry (GB); Ian Edington, Coventry (GB)

(73) Assignee: JAGUAR LAND ROVER LIMITED, Coventry (GB)

(*) Notice: Subject to any disclaimer, the term of this patent is extended or adjusted under 35 U.S.C. 154(b) by 23 days.

(21) Appl. No.: 16/484,965

(22) PCT Filed: Jan. 31, 2018

(86) PCT No.: PCT/EP2018/052336
§ 371 (c)(1),
(2) Date: Aug. 9, 2019

(87) PCT Pub. No.: WO2018/149637
PCT Pub. Date: Aug. 23, 2018

(65) Prior Publication Data
US 2019/0360406 A1    Nov. 28, 2019

(30) Foreign Application Priority Data

Feb. 15, 2017 (GB) ...................... 1702444

(51) Int. Cl.
*F02D 41/22* (2006.01)
*F02D 13/02* (2006.01)
(Continued)

(52) U.S. Cl.
CPC ......... *F02D 13/0203* (2013.01); *F02D 13/08* (2013.01); *F02D 41/0002* (2013.01);
(Continued)

(58) Field of Classification Search
CPC .. F02D 13/0203; F02D 13/08; F02D 41/0002; F02D 41/042; F02D 41/065;
(Continued)

(56) References Cited

U.S. PATENT DOCUMENTS

2011/0196596 A1    8/2011    Schleser et al.
2016/0222870 A1    8/2016    Provost

FOREIGN PATENT DOCUMENTS

| CN | 201835918 U | 5/2011 |
| CN | 203847247 U | 9/2014 |

(Continued)

OTHER PUBLICATIONS

Combined Search and Examination Report under Sections 17 and 18(3) for Application No. GB1702444.9 dated Jul. 19, 2017.
(Continued)

*Primary Examiner* — Hai H Huynh
(74) *Attorney, Agent, or Firm* — Carlson, Gaskey & Olds

(57) ABSTRACT

A method (30) of protecting an internal combustion engine (12) of a vehicle (10) from damage by induction of liquid, the method (30) comprising: detecting (31) liquid in a gas induction system (11) to the engine (12); and causing (32) valve control means (44) to at least perform one or both of the following: inhibiting gas intake into a combustion chamber (47) of the engine (12) during a gas intake stage (50) of a combustion cycle of the combustion chamber (47); causing gas exhaust from a combustion chamber (47) of the engine (12) during a gas compression stage (51) of the combustion cycle of the combustion chamber (47), wherein the valve control means (44) comprises at least one of a hydraulic circuit or an electromagnetic actuator for controlling, at least in part, the inhibiting gas intake into a combustion chamber (47) and/or at least one of a hydraulic circuit or an electro-
(Continued)

magnetic actuator for controlling, at least in part, the causing gas exhaust from a combustion chamber (47).

15 Claims, 4 Drawing Sheets

(51) Int. Cl.

| | | |
|---|---|---|
| *F02D 13/08* | (2006.01) | |
| *F02D 41/00* | (2006.01) | |
| *F02D 41/04* | (2006.01) | |
| *F02D 41/06* | (2006.01) | |
| *F02M 35/10* | (2006.01) | |

(52) U.S. Cl.
CPC ......... *F02D 41/042* (2013.01); *F02D 41/065* (2013.01); *F02D 41/22* (2013.01); *F02M 35/10393* (2013.01); *F02D 2041/001* (2013.01)

(58) Field of Classification Search
CPC .. F02D 41/22; F02D 41/062; F02D 2041/001; F02D 2041/002; F02M 35/10393; F02M 35/088; F02M 35/168; Y02T 10/40; Y02T 10/12; F01L 2710/006; F02B 61/045

USPC .... 123/90.11, 90.12, 90.15, 198 D; 701/103, 701/107

See application file for complete search history.

(56) References Cited

FOREIGN PATENT DOCUMENTS

| | | |
|---|---|---|
| DE | 3736777 C1 | 12/1988 |
| DE | 10053149 A1 | 5/2002 |
| EP | 1201910 A2 | 5/2002 |
| EP | 2881316 A1 | 6/2015 |

OTHER PUBLICATIONS

International Search Report and Written Opinion of the International Searching Authority for International application No. PCT/EP2018/052336 dated Jul. 6, 2018.

Combined Search and Examination Report under Sections 17 and 18(3) for Application No. GB1801548.7 dated Jul. 27, 2018.

Patents Act 1977: Search Report under Section 17, Application No. GB1801 548.7 dated Mar. 17, 2020.

PROTECTING AN INTERNAL COMBUSTION ENGINE OF A VEHICLE FROM DAMAGE BY INDUCTION OF LIQUID

TECHNICAL FIELD

The present disclosure relates to a method. In particular, but not exclusively it relates to protecting an internal combustion engine in a vehicle from damage by induction of liquid into the internal combustion engine.

Aspects of the invention relate to a method, a controller, a system, a powertrain, an engine and a vehicle.

BACKGROUND

If liquid from outside a vehicle such as water is allowed to be aspirated into combustion chambers of an internal combustion engine, damage can occur. Mechanical failure of the engine can occur due to hydraulic lock. Hydraulic lock occurs when a volume of liquid greater than the volume of a combustion chamber at its minimum (at the end of the piston's stroke at or around top dead centre) enters the cylinder. Since liquids are nearly incompressible the piston cannot complete its travel without stopping engine rotation or causing a mechanical failure.

Water can enter combustion chambers via the gas (e.g. air) induction system to the engine. If a motor vehicle is wading (driving) through water or becomes submerged during a flood, the gas induction system may become submerged and water can consequently be inducted (aspirated) into the combustion chambers, causing hydraulic lock or at least increasing the risk of engine knock (pre-ignition).

Prior solutions involve closing a flap in the gas induction system upon detection of water entering the gas induction system. However such solutions fail to prevent aspiration of water that is already past the flap.

It is an aim of the present invention to protect an internal combustion engine of a vehicle from damage by induction of liquid.

SUMMARY OF THE INVENTION

Aspects and embodiments of the invention provide a method, a controller, a system, a powertrain, an engine and a vehicle as claimed in the appended claims.

According to an aspect of the invention there is provided a method of protecting an internal combustion engine of a vehicle from damage by induction of liquid, the method comprising:

detecting whether liquid has ingressed via a gas induction system for the engine; and causing valve control means to at least perform one or both of the following:

inhibiting gas intake into a combustion chamber of the engine during a gas intake stage of a combustion cycle of the combustion chamber;

causing gas exhaust from a combustion chamber of the engine during a gas compression stage of the combustion cycle of the combustion chamber wherein the valve control means comprises at least one of a hydraulic circuit or an electromagnetic actuator for controlling, at least in part, the inhibiting gas intake into a combustion chamber and/or at least one of a hydraulic circuit or an electromagnetic actuator for controlling, at least in part, the causing gas exhaust from a combustion chamber.

Valves are engine valves for each combustion chamber used to control internal combustion. This provides the advantage that the engine is restricted from attempting to compress liquid that has entered or is about to enter the combustion chamber. The hydraulic circuit and/or electromagnetic actuator provides the advantage of a faster response, further reducing damage to the engine.

The causing gas exhaust from a combustion chamber may comprise opening at least one exhaust valve (commonly a poppet valve) of the combustion chamber. Opening the exhaust valve during the gas compression stage advantageously prevents compression of any liquid in the combustion chamber, and ejects the liquid into the exhaust system and not back into the gas induction system.

Additionally or alternatively, the causing gas exhaust from a combustion chamber may comprise retarding closing of an intake valve that is open during a gas intake stage of the combustion cycle. This lowers the effective compression ratio, reducing the likelihood of hydrolock.

The causing gas exhaust from a combustion chamber may be performed as part of an engine rundown process in which the internal combustion engine is stopped and/or as part of an engine restart process in which the internal combustion engine is started. Stopping the engine refers to stopping internal combustion-induced crank rotation. Starting the engine refers to starting internal combustion-induced crank rotation. The inhibiting gas intake from a combustion chamber may additionally or alternatively be performed as part of the engine rundown process. This provides the advantage of preventing compression of any liquid that may have entered the combustion chamber prior to, during or after engine rundown.

The inhibiting gas intake into a combustion chamber may comprise preventing opening of at least one intake valve (commonly a poppet valve) of the combustion chamber. Preventing opening of the intake valve during the gas intake stage advantageously prevents aspiration, and therefore prevents subsequent compression, of any liquid that has passed through the gas induction system and is about to enter the combustion chamber.

The inhibiting gas intake into a combustion chamber may be performed as part of an engine rundown process in which the internal combustion engine is stopped The valve control means may comprise an active tappet. Active tappets are mechanisms for varying the total mass and/or timing of admission of gas entering a combustion chamber of an engine and/or timing of the exhaust of combustion gas from a combustion chamber of an engine. Active tappets may be regarded as enabling 'continuously variable valve lift' (variable valve lift with substantially continuous lift adjustment) and/or 'discrete variable valve lift' (variable valve lift with stepped lift adjustment). An active tappet may include a hydraulic circuit whose volume is controlled by an electrically actuated valve, such as a solenoid valve, responsive to a command from a controller.

The valve control means may comprise a hydraulic circuit for controlling, at least in part, the inhibiting gas intake into a combustion chamber and/or a hydraulic circuit for controlling, at least in part, the causing gas exhaust from a combustion chamber. Each hydraulic circuit may define, at least in part, an active tappet. The active tappet may comprise at least one hydraulic circuit with a controllable reservoir to make an effective camshaft lobe profile that is different from a physical camshaft lobe profile. This provides the advantage of a faster response, further reducing damage to the engine. The response delay with or without active tappets, for switching from allowing to inhibiting gas intake during gas intake stages may be shorter than, or nearly as short as, a full combustion cycle.

The valve control means may comprise an electromagnetic actuator for controlling, at least in part, the inhibiting gas intake into a combustion chamber and/or an electromagnetic actuator for controlling, at least in part, the causing gas exhaust from a combustion chamber. The or each electromagnetic actuator may be provided for actuating each valve instead of a conventional camshaft for actuating a plurality of valves. Electromagnetic actuators provide the advantage of a faster response, further reducing the likelihood of damage to the engine. This is because valve lift and/or timing can be controlled at any time during a combustion cycle, not confined to a predetermined camshaft lobe profile.

The valve control means may comprise camshaft control means for controlling, at least in part, the inhibiting gas intake into a combustion chamber and/or camshaft control means for controlling, at least in part, the causing gas exhaust from a combustion chamber. The or each camshaft control means may comprise a double lobe profile, with an active tappet or similar means for controlling the extent of the resulting valve lift. In some examples the camshaft control means may be a cam switcher, employed to switch between a plurality of different physical camshaft lobe profiles to control the extent of the resulting valve lift.

If the gas induction system comprises a heat exchanger, detecting whether liquid has ingressed via the gas induction system may be dependent on a signal indicative of liquid in the gas induction system from a sensor located downstream of a heat exchanger in the gas induction system. The heat exchanger may be an intercooler. This provides the advantage that heat exchanger condensate may be detected, and the above method may be employed to prevent damage from aspiration of heat exchanger condensate.

Detecting whether liquid has ingressed via the gas induction system may be based upon any measurable parameter that disambiguates air from water. Detection may for example rely upon a measurable characteristic that water has that air does not such as for example electrical properties, chemical properties, physical properties. For example, detecting whether liquid has ingressed via the gas induction system may comprise sensing a chilling effect at a sensor and/or a change in electrical resistance at a sensor. The sensor may be an existing sensor for use in other purposes such as an air flow meter (AFM). The sensor may be a mass air flow (MAF) meter. The sensor may be a hot-film air mass meter (HFM). The sensor may be a hot wire sensor. The sensor may be located upstream of fuel injectors. The advantage is that no additional sensors may be required.

According to a further aspect of the invention there is provided a method comprising:
  comparing a signal indicative of liquid in the gas induction system with a threshold and/or with one or more other variables indicative of a current operating state of one or more other vehicle systems other than the gas induction system; and
  wherein inhibiting gas intake into a combustion chamber during a gas intake stage of a combustion cycle of the combustion chamber, by controlling valve control means, and/or causing gas exhaust from a combustion chamber during a gas compression stage of the combustion cycle of the combustion chamber, by controlling valve control means, is performed in dependence on the comparison.

According to another aspect of the invention there is provided a controller comprising means for carrying out the method of any preceding claim. The means may comprise at least one processor; and at least one memory, including computer program code; the at least one memory and the computer program code configured to, with the at least one processor, cause the controller to at least perform the method as described herein.

According to a further aspect of the invention there is provided a computer program for providing protection of an internal combustion engine of a vehicle from damage by induction of liquid, the computer program comprising instructions that, when executed by one or more processors, cause a controller to perform at least the method as described herein.

According to a further aspect of the invention there is provided a system comprising the controller and a sensor for sensing liquid in the gas induction system for operable coupling to the controller. The system may comprise the gas induction system or a part thereof arranged to receive the sensor.

According to a further aspect of the invention there is provided a powertrain comprising the controller or the system and an internal combustion engine.

According to a further aspect of the invention there is provided a vehicle comprising the controller or the system or the powertrain.

According to a further aspect of the invention there is provided a method of protecting an internal combustion engine of a vehicle from damage by induction of liquid, the method comprising:
  detecting whether liquid has ingressed via the gas induction system for the engine; and
  causing an active tappet to at least perform one or both of the following:
    inhibiting gas intake into a combustion chamber of the engine during a gas intake stage of a combustion cycle of the combustion chamber;
    causing gas exhaust from a combustion chamber of the engine during a gas compression stage of the combustion cycle of the combustion chamber.

According to a further aspect of the invention there is provided a method of protecting an internal combustion engine of a vehicle from damage by induction of liquid, the method comprising:
  detecting whether liquid has ingressed via the gas induction system for the engine; and
  performing one or both of the following:
    inhibiting gas intake into a combustion chamber of the engine during a gas intake stage of a combustion cycle of the combustion chamber;
    causing gas exhaust from a combustion chamber of the engine during a gas compression stage of the combustion cycle of the combustion chamber.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
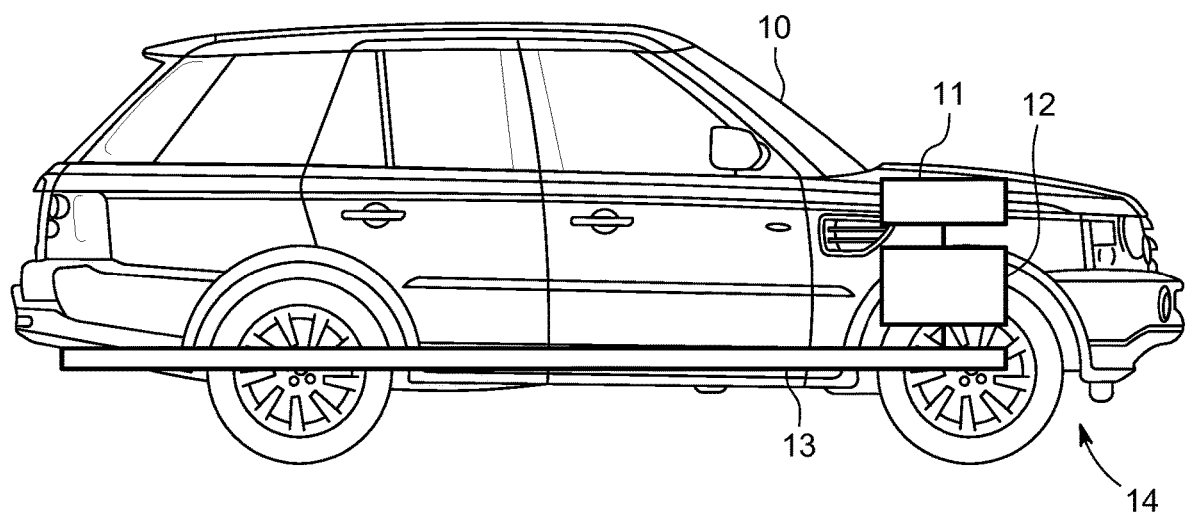
FIG. 1 illustrates an example of a vehicle.

The Figures illustrate a method 30 of protecting an internal combustion engine 12 of a vehicle 10 from damage by induction of liquid, the method 30 comprising: detecting 31 whether liquid has ingressed via a gas induction system 11 for the engine 12; and causing 32 valve control means 44 to at least perform one or both of the following: inhibiting gas intake into a combustion chamber 47 of the engine 12 during a gas intake stage 50 of a combustion cycle of the combustion chamber 47; causing gas exhaust from a combustion chamber 47 of the engine 12 during a gas compression stage 51 of the combustion cycle of the combustion chamber 47.

FIG. 1 illustrates an example of a vehicle 10 in which embodiments of the invention can be implemented. In some, but not necessarily all examples, the vehicle 10 is a passenger vehicle. Passenger vehicles generally have kerb weights of less than 5000 kg.

In FIG. 1 the vehicle 10 comprises a powertrain 14. The powertrain 14 of FIG. 1 includes an internal combustion engine 12, herein referred to as an engine 12. In some, but not necessarily all examples, the engine 12 is configured to operate at a high compression ratio such as above 12:1, although other compression ratios are appropriate in other examples. The higher the compression ratio, the greater the potential risk of engine knocking if liquid (for example water) is aspirated into the engine 12. In some, but not necessarily all examples, the engine 12 is a four-stroke engine.

The powertrain 14 refers to the mechanism that transmits drive from the engine 12 of a vehicle 10 to its drive axles (not shown). The powertrain 14 may be arranged for two wheel drive and/or for four wheel drive.

The powertrain 14 also includes a gas induction system 11 providing a gas path 401 from an gas inlet 402 external to the engine 12, to inside the engine 12, so that gas external to the engine 12 can be aspirated into the engine 12 and internally combusted.

The powertrain 14 also includes an exhaust system 13 providing a gas path 401 from inside the engine 12 to a location external to the vehicle 10.

Figure 2A:
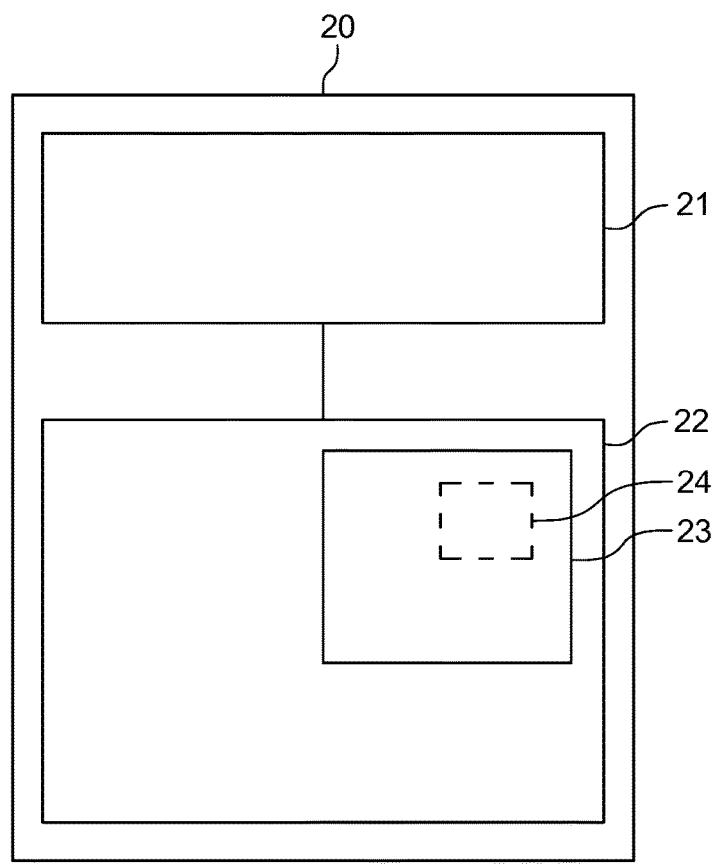
FIG. 2A illustrates an example of a controller.

FIG. 2A shows an example of a controller 20 of the powertrain 14 and/or the engine 12. In some, but not necessarily all examples, the controller 20 is an engine control unit (ECU).

Figure 2B:
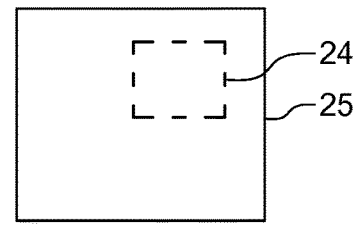
FIG. 2B illustrates an example of a computer readable medium.

For purposes of this disclosure, it is to be understood that the controller(s) 20 described herein can each comprise a control unit or computational device having one or more electronic processors 21. A vehicle 10 and/or a system thereof may comprise a single control unit or electronic controller or alternatively different functions of the controller(s) may be embodied in, or hosted in, different control units or controllers. A set of instructions 24 could be provided which, when executed, cause said controller(s) or control unit(s) to implement the control techniques described herein (including the described method(s)). The set of instructions may be embedded in one or more electronic processors 21, or alternatively, the set of instructions could be provided as software 23 stored in at least one memory 22 to be executed by one or more electronic processor(s) 21. For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium 25 (e.g., a non-transitory storage medium) as shown in FIG. 2B that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

Figure 3:
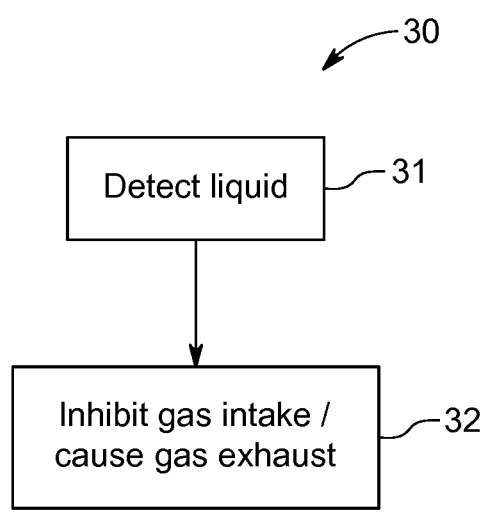
FIG. 3 illustrates an example of a method.

The controller 20 is configured to perform a method 30 as shown in FIG. 3.

The method 30 includes, at block 31, detecting whether liquid has ingressed via a gas induction system 11 for the engine 12. In some, but not necessarily all examples, this means detecting that liquid is in the gas induction system 11 itself. The method 30 is optimised for the detection of water. In some examples it is additionally or alternatively designed for the detection of other liquids. In some, but not necessarily all examples, the detection is positive if the presence or quantity of liquid detected carries an unacceptably high risk of causing engine damage (e.g. by hydraulic locking and/or knocking), should the liquid be aspirated into the engine 12.

The definition of an unacceptable high risk depends according to one or more criteria. The definition of unacceptable can be fixed (fixed threshold) or variable. For example, the controller 20 can be arranged to compare a signal indicative of liquid in the gas induction system 11 with a fixed threshold. The signal may be indicative of the presence of liquid or of a quantity of liquid. In some, but not necessarily all examples, the fixed threshold represents a fixed quantity of liquid or a fixed rate of change of liquid with respect to time or a fixed accumulation over time. If the threshold is passed, the detection is positive.

In some, but not necessarily all examples, multiple signals are indicative of the presence of liquid at multiple locations in the gas induction system 11. The controller 20 can be arranged to only make a positive detection when the one or more criteria are met for each location. Alternatively information from the multiple signals can be combined and the result can be compared with one or more criteria.

In an example of a variable definition of the unacceptably high risk, the controller 20 can interrogate a lookup map. The lookup map can define a look-up for comparing the signal with one or more other variables indicative of a current operating state of one or more other vehicle systems, other than the gas induction system 11. Examples of the other variables include, vehicle speed, engine speed, engine torque demand or torque output, detected engine knock, engine temperature or a current vehicle mode such as a wade assist ('wade aid') mode. The additional variables provide information that enables the risk of damage to be more accurately determined. For example if the engine 12 is in a state in which it is susceptible to knocking, such as low engine speed and high torque demand, then the threshold is lower to reduce the chance of knocking induced by liquid aspiration.

In an example implementation the risk is unacceptable when a measured air flow is implausible, for example due to a sudden high airflow measured with respect to an unacceptability threshold. In another example implementation, an airflow reading is significantly higher than the airflow which is modelled from other sensors monitoring the engine operating condition (e.g. from a mass balance).

Figure 4:
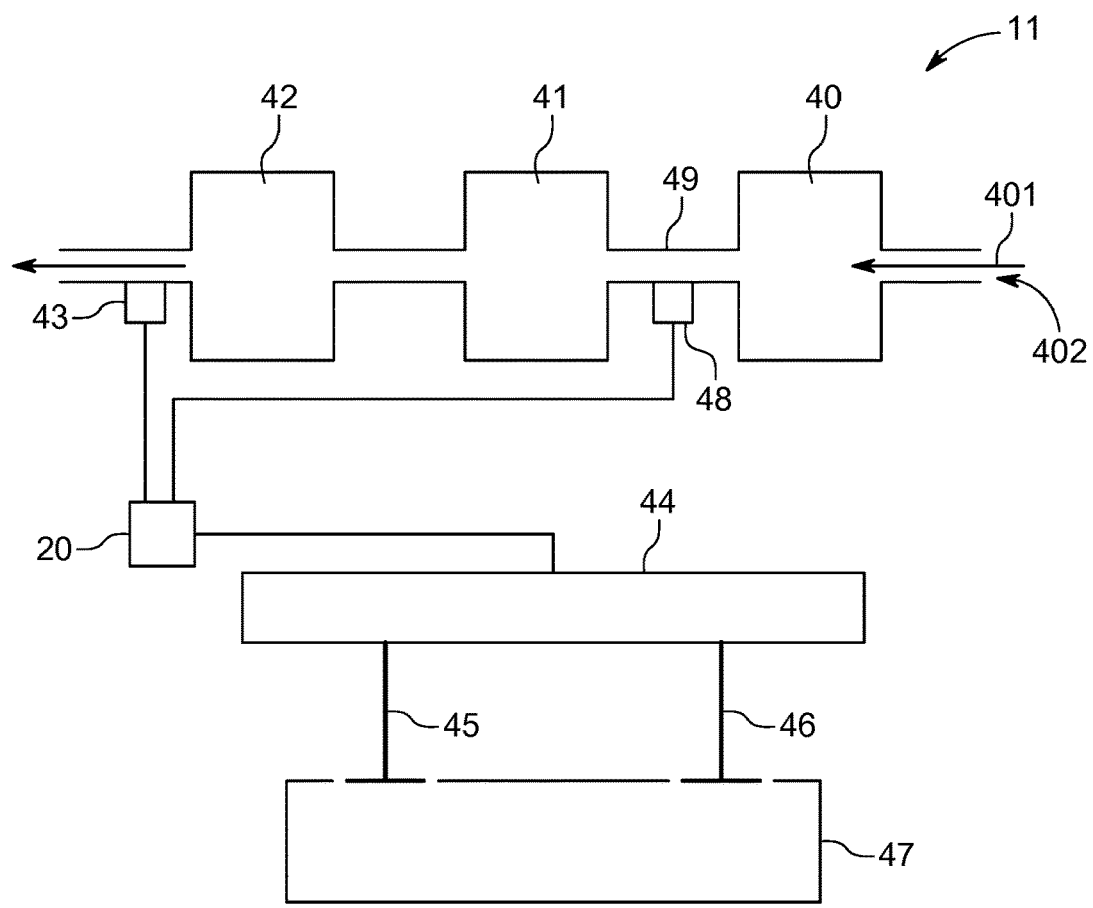
FIG. 4 illustrates an example of part of a powertrain.

With reference to both FIG. 3 and FIG. 4, the method 30 proceeds to block 32 in response to a positive detection as described above. Block 32 comprises: causing valve control means 44 to at least perform one or both of the following: inhibiting gas intake into a combustion chamber 47 of the engine 12 during a gas intake stage 50 of a combustion cycle of the combustion chamber 47; causing gas exhaust from a combustion chamber 47 of the engine 12 during a gas compression stage 51 of the combustion cycle of the combustion chamber 47.

In some examples the operation of block 32 is performed for all of the combustion chambers of the engine 12. This operation can comprise the controller 20 transmitting a control signal to the valve control means 44 to cause the inhibiting gas intake and/or causing gas exhaust. In some, but not necessarily all examples, the control signal is transmitted immediately in response to the positive detection.

Prior to the control signal being transmitted, the valve control means 44 does not inhibit gas intake into the combustion chamber 47 of the engine 12 during a gas intake stage 50 of a combustion cycle of the combustion chamber 47, and the valve control means 44 does not cause gas exhaust from the combustion chamber 47 of the engine 12 during a gas compression stage 51 of the combustion cycle of the combustion chamber 47.

Once liquid is no longer detected in the gas induction system 11, the valve control means 44 does not inhibit gas intake into the combustion chamber 47 of the engine 12 during a gas intake stage 50 of a combustion cycle of the combustion chamber 47, and the valve control means 44 does not cause gas exhaust from the combustion chamber 47 of the engine 12 during a gas compression stage 51 of the combustion cycle of the combustion chamber 47.

In some, but not necessarily all examples, the control signal is an engine rundown command signal, for starting an engine rundown process in which the inhibiting gas intake and/or the causing gas exhaust is performed. In some, but not necessarily all examples, the engine rundown process further comprises cutting ignition and/or cutting fuel injection in response to the control signal. Performance of the engine rundown process ceases internal combustion-induced crank rotation. In some examples, ignition and/or fuel injection may be reduced or retarded rather than cut.

The engine 12 is protected from damage because hydraulic locking and/or knocking is avoided by control of the valves. Therefore the engine rundown process does not necessarily require crank rotation to cease or even for the vehicle 10 to come to a halt. For example, if the vehicle 10 is a hybrid vehicle the vehicle 10 may continue to be driven using a different prime mover such as an electric motor. This advantageously enables the vehicle to be driven out of a location in which liquid can enter the gas induction system 11, such as flooded location. The vehicle transmission (not shown) can even be left in gear so that crank rotation continues while the vehicle 10 is moving.

In some, but not necessarily all examples, the method 30 is performed as part of an engine restart process. In some, but not necessarily all examples, the control signal is transmitted as part of the engine restart process so that the causing gas exhaust is performed. This causes any liquid that has already been aspirated into the combustion chamber 47 to be expelled from the combustion chamber 47 without causing damage, as the engine 12 is started by a driver.

In some, but not necessarily all examples the above-described comparison of the signal with the threshold and/or the lookup map interrogation, is performed by the controller 20 repeatedly, for example periodically, while the vehicle 10 is in an ignition-on ('key on') state to continuously monitor if an engine rundown process is needed. In some examples the signal comparison is performed repeatedly, for example periodically, while the vehicle 10 is in an ignition-off ('key-off' state) to determine whether the causing gas exhaust is to be performed during the engine restart process. For example the method 30 can be performed during a vehicle 'wake up' process for supplying battery power to vehicle systems, initiated by a vehicle key or key fob, while the vehicle 10 is in a key-off state.

FIG. 4 will be described in more detail. FIG. 4 shows a system arranged to perform the method 30 as described in relation to FIG. 3.

The system comprises a gas induction system 11. The gas induction system 11 comprises a housing 49 providing a gas path 401 to the combustion chamber 47. A number of components are provided in series along the gas path 401. In some, but not necessarily all examples, the gas induction system 11 comprises two or more housings, each housing 49 providing a gas path 401 to a separate subset of the combustion chambers of the engine 12.

In FIG. 4, the or each housing 49 comprises an open end defining a gas inlet 402. The gas inlet 402 has a sufficient cross-sectional area to allow gas (and also liquid) to freely enter the gas induction system 11. The next element in the series is a gas filter enclosure 40 for a gas filter (e.g. air filter). In other examples, an open element gas filter is provided at the gas inlet 402 of the housing 49 so no gas filter enclosure is needed. It is possible for liquid to get past the gas filter.

In the example of FIG. 4, an air flow sensor 48 is provided next in the series. In some, but not necessarily all examples, the air flow sensor 48 is a mass air flow sensor for measuring the quantity of gas flowing along the gas path 401 into the engine 12. In other examples the air flow sensor 48 is additionally or alternatively provided elsewhere along the series such as after a gas compressor 41.

In some, but not necessarily all examples, the air flow sensor 48 is operably coupled to the controller 20 to provide a measurement indicative of liquid in the gas induction system 11. The measurement is transmitted via a signal to the controller 20 which makes the above-described signal comparison.

Different types of air flow sensor 48 can be used as liquid sensors. In some, but not necessarily all examples, the air flow sensor 48 used as a liquid sensor is a hot wire sensor. In an implementation, the air flow sensor 48 comprises a hot wire forming the fourth resistor that completes a wheatstone bridge. When liquid comes into contact with the hot wire the hot wire is chilled, which results in an abnormal measurement, compared to what would be possible if air was present in the gas induction system 11. In some, but not necessarily all examples, the above-mentioned signal comparison by the controller 20 involves detecting the abnormal measurement caused by chilling.

The air flow sensor 48 is an example of a sensor which is for multiple functions not restricted to liquid detection. The use of multi-function sensors advantageously means that no additional sensors are required for liquid detection.

In FIG. 4, but not necessarily in all examples, the next element in the series is a gas compressor 41 such as a turbocharger or supercharger. Some powertrains comprise a plurality of turbochargers in which case a plurality of gas compressors 41 can be provided in series.

The next element in the series of FIG. 4 is a heat exchanger 42. In some, but not necessarily all examples, the heat exchanger 42 is an intercooler. Heat exchangers are optional but they are often provided in conjunction with turbochargers or superchargers.

In some, but not necessarily all examples, the next element in the series is a downstream sensor 43. The downstream sensor 43 is located downstream of the heat exchanger 42 and is a liquid sensor arranged to sense the presence of liquid. The downstream sensor 43 is operably coupled to the controller 20. The purpose of locating a liquid sensor or an additional liquid sensor downstream is to enable the sensing of excessive condensate formed in the heat exchanger 42 which could be aspirated into the engine 12. The condensate would be missed by a sensor upstream of the heat exchanger 42 such as the air flow sensor 48. The downstream sensor may advantageously enable a more accurate determination of the quantity of liquid that may enter the combustion chamber 47 and/or the extent of liquid ingress along the gas induction system 11.

Different types of sensor can be used as the downstream sensor 43. In some, but not necessarily all examples, the downstream sensor 43 is a hot wire sensor as described above, or a sensor that detects a change in electrical resistance between electrodes caused by the presence of liquid therebetween. The controller 20 can receive signals from the downstream sensor 43 for the purpose of determining the presence of liquid in the gas induction system 11.

Any number of intervening elements may be provided in the series between the above-mentioned elements, including no intervening elements.

The controller 20 receives measurements from any available liquid sensors such as one or both of the above-mentioned liquid sensors, in order to perform the method 30 described in relation to FIG. 3. In some examples additional sensors could be provided. The controller 20 is operably coupled to valve control means 44 such that a control signal is sent to the valve control means 44.

The valve control means 44 refers to the hardware (in the cylinder head of the engine 12) providing engine intake valve control means and/or engine exhaust valve control means. Engine intake valves and engine exhaust valves are the valves actuated at controlled times during a combustion cycle, for controlling gas flow into and out of individual combustion chambers respectively to modulate internal combustion. The valve control means 44 therefore controls the opening of at least one intake valve 45 and/or at least one exhaust valve 46 of each combustion chamber 47. The valve control means 44 is arranged to open at least one intake valve 45 for controlling the aspiration of gas from the gas induction system 11 into the combustion chamber 47. The valve control means 44 is arranged to open at least one exhaust valve 46 for controlling the flow of gas out of the combustion chamber 47 and into the gas exhaust system 13.

Figure 5:
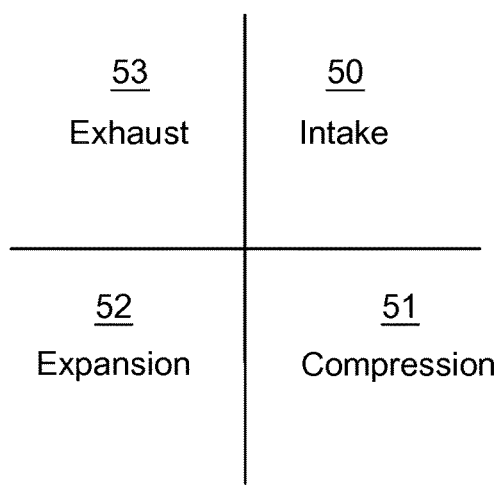
FIG. 5 illustrates an example of a combustion cycle.

With reference to the valve timing graph in FIG. 5 for a four-stroke combustion cycle, it is conventional to open intake valves 45 of the combustion chamber 47 only during the gas intake stage 50 of the combustion cycle in the combustion chamber 47 and to not open the intake valves 45 during the gas expansion stage 52 of the combustion cycle. In both the gas intake stage 50 and the gas expansion stage 52 a piston (not shown) in the combustion chamber 47 travels away from top dead centre towards bottom dead centre. The valve control means 44 is configured to enable this conventional functionality.

It is also conventional to open exhaust valves 46 only during the gas exhaust stage 53 of the combustion cycle in the combustion chamber 47, and to not open the exhaust valves 46 during the gas compression stage 51 of the combustion cycle. In both the gas exhaust stage 53 and the gas compression stage 51, a piston (not shown) in the combustion chamber 47 travels towards top dead centre from bottom dead centre. The valve control means 44 is configured to enable this conventional functionality.

The valve control means 44 is additionally arranged to realise not only conventional four stroke operation of the engine 12 but also the method 30 of FIG. 3. In some, but not necessarily all examples, the valve control means 44 is able to perform one or more of the following interrupts to the conventional four-stroke process: preventing opening of the intake valves 45 during the gas intake stage 50; opening the exhaust valves 46 during the gas compression stage 52; retarding closing of an intake valve, in response to receiving the above-described control signal.

Preventing opening of an intake valve 45 of a combustion chamber 47 during a gas intake stroke 50 means that the intake valve 45 remains closed or substantially closed, for the entire time between piston top dead centre and piston bottom dead centre of the gas intake stroke 50. The purpose is to prevent liquid ingress into the combustion chamber 47.

Opening an exhaust valve 46 of a combustion chamber 47 during a gas compression stroke 52 means that the exhaust valve 46 opens for at least part of the time period between piston bottom dead centre and piston top dead centre of the gas compression stroke 52, optionally for all of nearly all of that time period. The purpose is to enable liquid egress from the combustion chamber 47.

In this example, retarding closing of an intake valve causes gas exhaust from the combustion chamber 47 during a gas compression stroke 52. This is referred to as late intake valve closing (LIVC) herein. LIVC can be performed by phasing the opening and closing times of the valve together, or by phasing the closing time of the valve independently of the opening time, depending on the hardware. In a reciprocating engine, the closing time occurs after bottom dead centre defining the beginning of the gas compression stroke 52, and before the next top dead centre. In some implementations, the retarded closing time may occur more than 10 degrees, or more than 30 degrees after the bottom dead centre.

Figure 6:
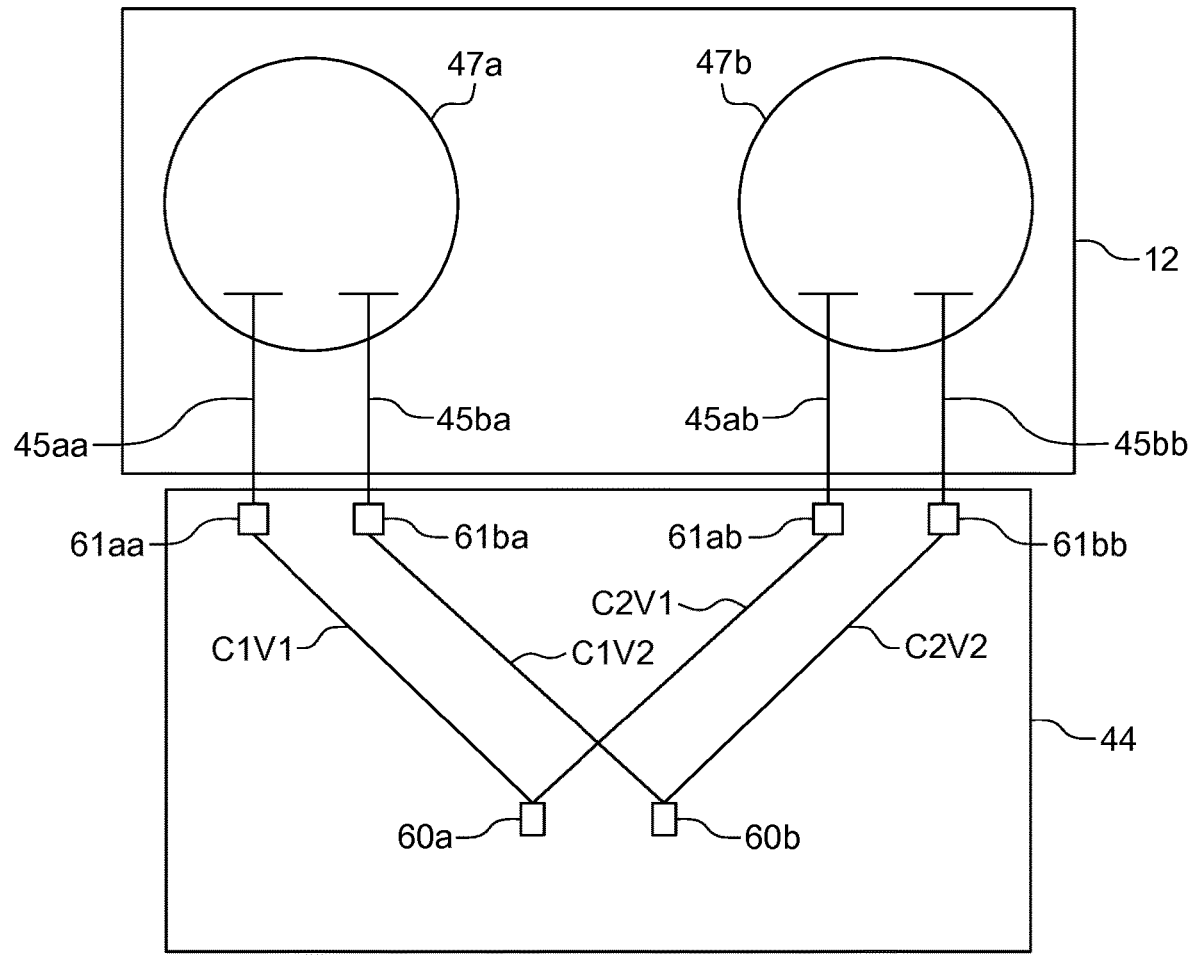
FIG. 6 illustrates an example of valve control means and an engine.

An example of suitable hardware for the valve control means 44 is shown in FIG. 6. FIG. 6 is simplified to show an engine 12 with only two combustion chambers, and two valves per combustion chamber. However FIG. 6 does not limit the valve control means 44 in terms of the number of combustion chambers, valves controlled, or the type of valves. The valves may be intake or exhaust valves.

FIG. 6 illustrates an example of valve control means 44 for controlling valve lifts of intake valves 45aa-45bb of combustion chambers of the engine 12, the valve control means 44 comprising at least: a first master piston 61aa, arranged to control a lift of a first intake valve 45aa of a first combustion chamber 47a; a second piston 61ba, arranged to control a lift of a second intake valve 45ba of the first combustion chamber 47a; a third piston 61ab, arranged to control a lift of a first intake valve 45*ab* of a second combustion chamber 47*b*; a fourth piston 45*bb*, arranged to control a lift of a second intake valve 45*bb* of the second combustion chamber 47*b*; a first hydraulic circuit C1V1, C2V1 arranged to operate, at different times, the first piston 61*aa* and the third piston 61*ab*, but not the second piston 61*ba* and the fourth piston 61*bb*; and a second hydraulic circuit C1V2, C2V2 arranged to operate, at different times, the second piston 61*ba* and the fourth piston 61*bb*, but not the first piston 61*aa* and the third piston 61*ab*.

The first piston 61*aa*, second piston 61*ba*, third piston 61*ab* and fourth piston 61*bb* are arranged to move within slave piston cylinders (not shown), pushing their respective intake valves 45*aa*-45*bb* in dependence upon application of fluid displacement via the respective hydraulic circuits C1V1-C2V2. The fluid may be oil or other hydraulic fluid.

In the example of FIG. 6, the first hydraulic circuit has two passages C1V1, C2V1, leading to the first piston 61*aa* and the third piston 61*ab* respectively, as illustrated by the lines, but no passages to the second piston 61*ba* and the fourth piston 61*bb*. The second hydraulic circuit has two passages C1V2 and C2V2, leading to the second piston 61*ba* and the fourth piston 61*bb* respectively, as illustrated by the lines, but no passages to the first piston 61*aa* or the third piston 61*ab*.

Fluid displacement in the first hydraulic circuit C1V1, C2V1 is caused by camming of a first master piston 60*a* by a camshaft lobe (not shown). Fluid displacement in the second hydraulic circuit C1V2, C2V2 is caused by camming of a second master piston 60*b* by a camshaft lobe (not shown). A double-lobed cam profile (or single-lobed cam profile of a camshaft geared 1:1 with crank rotation) means that fluid displacement in each passage will be caused twice per combustion cycle. One or more suitable electrically actuated (solenoid controlled) directional control valves (not shown) can be employed to control the volume of hydraulic fluid in each passage, such that opening of specific intake valves can be allowed or prevented at different times in the combustion cycle. This 'active' behavior means that the master pistons 60*a*, 60*b*, hydraulic circuits C1V1-C2V2, pistons 61*aa*-61*bb* and bleed valves can be together controlled to provide an 'active tappet' arrangement. The active tappet arrangement ensures that an effective camshaft lobe profile is controllable to be different from a physical camshaft lobe profile. In some, but not necessarily all examples, the directional control valves, in use, can be actuated at predetermined times to enable discrete variable valve lift operation. In other examples, the directional control valves are controllable to actuate at any desired time to enable continuously variable valve lift operation.

The selective prevention of intake valve opening by the above active tappets can be used to inhibit gas intake into the combustion chamber 47 during the gas intake stage 50. If the hardware of FIG. 6 is employed for exhaust valves 46, the exhaust valves 46 can be allowed to open during the gas compression stage 51 to cause gas exhaust from the combustion chamber 47 during the gas compression stage 51.

Additional or alternative hardware from FIG. 6 is possible. In an alternative arrangement, each piston 61*aa*-61*bb* is coupled to an independent control circuit, so each piston 61*aa*-61*bb* is associated with its own separate master actuator, which may be hydraulic or electromagnetic, for example. This alternative arrangement may require additional hardware such as additional bleed (solenoid) valves, which may be controllable to enable continuously variable valve lift.

For example, an electromagnetic valve actuator (not shown) is employed as a master actuator. The electromagnetic valve actuator can comprise a solenoid mechanically coupled to the valve stem. A linear (plunger) output of a solenoid can be used to push the valve stem. In some examples, a rotating output of the electromagnetic actuator could be used to move a short cam which pushes on the valve stem by camming. In some cases electromagnetic actuators can be employed in conjunction with the hardware of FIG. 6 in lieu of a conventional camshaft for actuating a plurality of valves.

Further additional or alternative hardware from FIG. 6 is possible. For example, one or more cam switchers (not shown) can be employed to physically move at least one camshaft along its axis. In one implementation, a cam switcher could move a camshaft along its axis so that the master pistons 60*a*, 60*b* (or other cam followers) are aligned with a camshaft base circle instead of being aligned with camshaft lobes. As a result, the master pistons 60*a*, 60*b* cannot be physically displaced by the camshaft. This enables valves such as intake valves 45 to remain closed during a gas intake stage 50. In another implementation, a cam switcher moves a camshaft along its axis so that the master pistons 60*a*, 60*b* (or other cam followers) are aligned with a different camshaft lobe from a conventional camshaft lobe. As a result, the timing of displacement of the master pistons 60, 60*b* can change according to the design of the different camshaft lobe. The changed timing enables valves such as exhaust valves 46 to open during a gas compression stage 51.

Although embodiments of the present invention have been described in the preceding paragraphs with reference to various examples, it should be appreciated that modifications to the examples given can be made without departing from the scope of the invention as claimed. For example, it is also possible that detecting whether liquid has ingressed via a gas induction system can be performed by monitoring dynamic properties of the engine, for example detecting an implausibly fast deceleration of angular velocity of a crankshaft or camshaft (e.g. using data from a crankshaft/camshaft position sensor) during a compression stroke could be interpreted as liquid causing excessive compression.

Various embodiments of the disclosure could be adapted for rotary engines, two stroke engines and other engine types.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method of protecting an internal combustion engine of a vehicle from damage by induction of liquid, the method comprising:
   detecting whether liquid has ingressed via a gas induction system for the engine; and causing valve control means to perform at least one of the following:
- inhibiting gas intake into a combustion chamber of the engine during a gas intake stage of a combustion cycle of the combustion chamber; and
- causing gas exhaust from a combustion chamber of the engine during a gas compression stage of the combustion cycle of the combustion chamber, wherein the valve control means comprises at least one of a hydraulic circuit or an electromagnetic actuator for at least partially controlling the at least one of the inhibiting gas intake and the causing gas exhaust.

2. The method as claimed in claim 1, wherein the causing gas exhaust comprises at least one of the following:
- opening at least one exhaust valve of the combustion chamber and
- retarding closing of an intake valve that is open during a gas intake stage of the combustion cycle.

3. The method according to claim 1, wherein the causing gas exhaust is performed as part of at least one of an engine rundown process in which the internal combustion engine is stopped and an engine restart process in which the internal combustion engine is started.

4. The method according to claim 1, wherein the inhibiting gas intake comprises preventing opening of at least one intake valve of the combustion chamber.

5. The method according to claim 1, wherein the inhibiting gas intake is performed as part of an engine rundown process in which the internal combustion engine is stopped.

6. The method according to claim 1, wherein the valve control means comprises camshaft control means for at least partially controlling at least one of the inhibiting gas intake and the causing gas exhaust.

7. The method according to claim 1, wherein the detecting is dependent on a signal indicative of liquid in the gas induction system from a sensor located downstream of a heat exchanger in the gas induction system.

8. The method according to claim 1, wherein the detecting comprises sensing at least one of a chilling effect and a change in electrical resistance at a sensor.

9. The method according to claim 1, comprising:
- comparing a signal indicative of liquid in the gas induction system with a threshold and/or with one or more other variables indicative of a current operating state of one or more other vehicle systems other than the gas induction system; and
- wherein performing at least one of the inhibiting gas intake and the causing gas exhaust is in dependence on the comparing.

10. A controller comprising:
- at least one processor; and
- at least one memory including computer program code, the at least one memory and the computer program code being configured to, with the at least one processor, cause the controller to
- detect whether liquid has ingressed via a gas induction system for an internal combustion engine of a vehicle; and
- cause valve control means to perform at least one of the following:
  - inhibiting gas intake into a combustion chamber of the engine during a gas intake stage of a combustion cycle of the combustion chamber; and
  - causing gas exhaust from a combustion chamber of the engine during a gas compression stage of the combustion cycle of the combustion chamber, wherein the valve control means comprises at least one of a hydraulic circuit or an electromagnetic actuator for at least partially controlling the at least one of the inhibiting gas intake and the causing gas exhaust.

11. The system comprising the controller of claim 10 and a sensor for sensing liquid in the gas induction system, the sensor providing an indication to the controller.

12. The system as claimed in claim 11, comprising the gas induction system arranged to receive the sensor.

13. A powertrain comprising the controller as claimed in claim 10.

14. A vehicle comprising the powertrain as claimed in claim 13.

15. A non-transitory storage medium containing a computer program comprising instructions that, when executed by one or more processors, cause a controller to perform:
- detecting whether liquid has ingressed via a gas induction system for an internal combustion engine of a vehicle; and
- causing valve control means to perform at least one of the following:
  - inhibiting gas intake into a combustion chamber of the engine during a gas intake stage of a combustion cycle of the combustion chamber;
  - causing gas exhaust from a combustion chamber of the engine during a gas compression stage of the combustion cycle of the combustion chamber, wherein the valve control means comprises at least one of a hydraulic circuit or an electromagnetic actuator for at least partially controlling the at least one of the inhibiting gas intake and the causing gas exhaust.

* * * * *